(12) United States Patent
Choi et al.

(10) Patent No.: US 8,428,380 B2
(45) Date of Patent: Apr. 23, 2013

(54) APPARATUS AND METHOD OF EMBEDDED QUANTIZATION FOR THE IMPROVED SNR SCALBILITY

(75) Inventors: Hae Chul Choi, Daejeon (KR); Jae Gon Kim, Daejeon (KR); Jin Woo Hong, Daejeon (KR); Sung-Jea Ko, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1438 days.

(21) Appl. No.: 11/996,099

(22) PCT Filed: Jul. 19, 2006

(86) PCT No.: PCT/KR2006/002829
§ 371 (c)(1),
(2), (4) Date: Mar. 6, 2008

(87) PCT Pub. No.: WO2007/011160
PCT Pub. Date: Jan. 25, 2007

(65) Prior Publication Data
US 2008/0193033 A1      Aug. 14, 2008

(30) Foreign Application Priority Data

| Jul. 19, 2005 | (KR) | 10-2005-0065484 |
| Oct. 12, 2005 | (KR) | 10-2005-0095818 |
| Jul. 18, 2006 | (KR) | 10-2006-0067093 |

(51) Int. Cl.
  *G06K 9/36*        (2006.01)
(52) U.S. Cl.
  USPC .................. 382/251; 375/240.03
(58) Field of Classification Search ............. 375/240.03; 382/251
See application file for complete search history.

(56) References Cited

U.S. PATENT DOCUMENTS

| 5,315,670 | A  | * | 5/1994  | Shapiro ................... 382/240 |
| 5,699,117 | A  | * | 12/1997 | Uramoto et al. ......... 348/390.1 |
| 6,160,846 | A  |   | 12/2000 | Chiang et al. |
| 6,263,022 | B1 |   | 7/2001  | Yingwei et al. |
| 6,501,797 | B1 |   | 12/2002 | van der Schaar et al. |
| 6,912,255 | B2 |   | 6/2005  | Drezner et al. |
| 2003/0142869 | A1 | * | 7/2003 | Blaettermann et al. ...... 382/232 |
| 2004/0093364 | A1 | * | 5/2004 | Cheng et al. ................ 708/203 |
| 2006/0039470 | A1 | * | 2/2006 | Kim et al. ................. 375/240.16 |
| 2008/0080615 | A1 | * | 4/2008 | Tourapis et al. ......... 375/240.03 |

OTHER PUBLICATIONS

International Search Report—Mailed Nov. 3, 2006.

* cited by examiner

*Primary Examiner* — Sath V Perungavoor
*Assistant Examiner* — Jeffery Williams
(74) *Attorney, Agent, or Firm* — Ladas & Parry LLP

(57) ABSTRACT

Provided are a method and apparatus for enhancing coding efficiency by performing encoding and decoding by optimally calculating quantization intervals and reconstruction values through a distribution of DCT coefficients of each frame, when DCT coefficients of each SNR enhancement layer are quantized in scalable video coding. The encoding apparatus includes: an R-D optimization unit performing Rate-Distortion (R-D) optimization based on a distribution of Discrete Cosine Transform (DCT) coefficients each slice and calculating a first reference value and a second reference value respectively indicating a start point and an end point of DCT coefficients quantized to "0"; a quantization interval setting unit setting adaptive quantization intervals on the basis of a minimum value and a maximum value of the DCT coefficients, the first reference value, and the second reference value; and a mapping unit mapping the DCT coefficients to the adaptive quantization intervals.

26 Claims, 13 Drawing Sheets

(a) PERFECT EMBEDDED QUANTIZATION (b) OVER-EMBEDDED QUANTIZATION (c) UNDER-EMBEDDED QUANTIZATION

APPARATUS AND METHOD OF EMBEDDED QUANTIZATION FOR THE IMPROVED SNR SCALBILITY

TECHNICAL FIELD

The present invention relates to a quantization apparatus and method for providing improved Signal-to-Noise Ratio (SNR) scalability.

BACKGROUND ART

A conventional H.264-based quantization method assigns Discrete Cosine Transform (DCT) coefficients to quantization intervals according to quantization parameters set for respective frames. However, since the conventional H.264-based quantization method does not follow a distribution of DCT coefficients of each quantization interval generated by a video encoding method supporting picture quality scalability, encoding efficiency is low.

DETAILED DESCRIPTION OF THE INVENTION

Technical Problem

The present invention provides a quantization apparatus and method which obtain a distribution of Discrete Cosine Transform (DCT) significant coefficients of the residues of each SNR enhancement layer generated by a video encoder with improved picture-quality scalability, and assign DCT coefficients of the corresponding frame to an optimal quantization interval, using Rate-Distortion (R-D) optimization, thereby providing high coding efficiency.

Technical Solution

According to an aspect of the present invention, there is provided a quantization apparatus providing improved Signal-to-Noise Ratio (SNR) scalability, including: an R-D optimization unit performing Rate-Distortion (R-D) optimization based on a distribution of Discrete Cosine Transform (DCT) coefficients of each slice and calculating a first reference value and a second reference value respectively indicating a start point and an end point of DCT coefficients quantized to "0"; a quantization interval setting unit setting adaptive quantization intervals on the basis of a minimum value and a maximum value of the DCT coefficients, the first reference value, and the second reference value; and a mapping unit mapping the DCT coefficients to the adaptive quantization intervals.

According to another aspect of the present invention, there is provided an encoder providing SNR scalability, including: a quantization unit performing R-D optimization based on a distribution of DCT coefficients of each slice, calculating quantization coefficient values and reference values respectively indicating a start value and an end value of DCT coefficients quantized to "0", and performing quantization; and a dequantization unit performing dequantization based on average values of DCT coefficients of respective intervals divided according to the reference values and the quantization coefficient values.

According to another aspect of the present invention, there is provided a codec providing improved SNR scalability, including: an R-D optimization unit performing R-D optimization based on a distribution of DCT coefficients of each slice and calculating a first reference value and a second reference value respectively indicating a start point and an end point of DCT coefficients quantized to "0"; a quantization interval setting unit setting adaptive quantization intervals based on a minimum value and a maximum value of the DCT coefficients, the first reference value, and the second reference value; a mapping unit mapping the DCT coefficients to the adaptive quantization intervals; an entropy encoding unit adding, to a bit stream, values encoded based on average values of DCT coefficients of respective intervals divided according to the reference values; and a dequantization unit performing dequantization based on both the average value of the DCT coefficients and quantization coefficient values extracted from the bit stream.

According to another aspect of the present invention, there is provided a quantization method providing improved SNR scalability including: performing R-D optimization based on a distribution of DCT coefficients of each slice and calculating a first reference value and a second reference value respectively indicating a start point and an end point of DCT coefficients quantized to "0"; setting adaptive quantization intervals on the basis of a minimum value and a maximum value of the DCT coefficients, the first reference value, and the second reference value; and mapping the DCT coefficients to the adaptive quantization intervals.

According to another aspect of the present invention, there is provided a coding method of providing improved SNR scalability, including: performing quantization after calculating by performing R-D optimization on the basis of a distribution of DCT coefficients of each slice, calculating quantization coefficient values and reference values respectively indicating a start point and an end point of a range of DCT coefficients quantized to "0"; and performing dequantization on the basis of average values of DCT coefficients of each section divided based on the reference values and the quantization coefficient values.

According to another aspect of the present invention, there is provided a computer readable recording medium having embodied thereon a computer program for executing the method.

DESCRIPTION OF THE DRAWINGS

The above and other features and advantages of the present invention will become more apparent by describing in detail exemplary embodiments thereof with reference to the attached drawings in which.

BEST MODE

Figure 1:
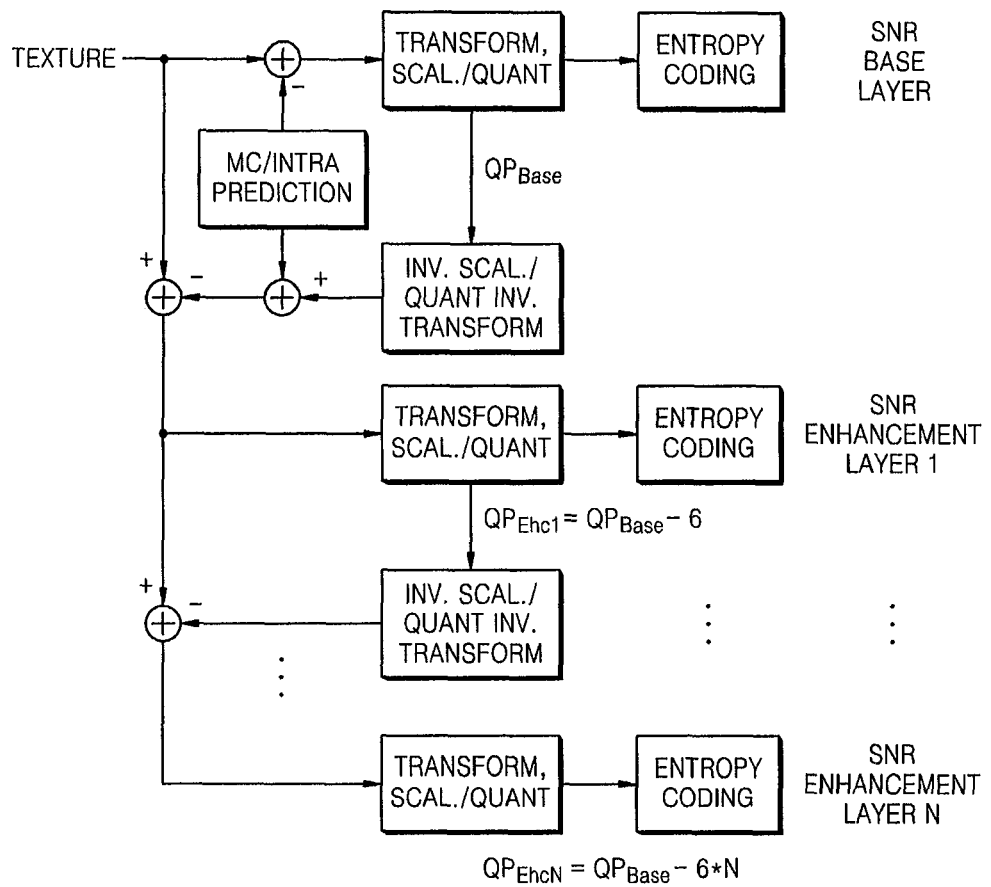
FIG. 1 illustrates a hierarchical structure for providing picture-quality scalability in a video encoding method supporting picture-quality scalability.

Hereinafter, the present invention will be described in detail by explaining preferred embodiments of the invention with reference to the attached drawings. Like reference numerals in the drawings denote like elements. In this specification, detailed descriptions related to functions or constructions well-known in the art will be omitted.

FIG. 1 is a block diagram illustrating a hierarchical structure for providing picture-quality scalability in a video encoding method supporting picture-quality scalability.

Referring to FIG. 1, a transformed image or an original image is input through the process of transformation, scaling, and quantization, and is generated as an encoded stream in a Signal-to-Noise Ratio (SNR) base layer. In order to generate an input image of a SNR enhancement layer, the encoded stream of the SNR base layer is processed by dequantization, descaling, inverse-transformation, and dequantization and thus is reconstructed as a low and a high image. A difference between the reconstructed image and the original image is generated as an input image of a SNR enhancement layer.

An enhancement encoding stream is generated in each enhancement layer, through the same method as that used in the SNR base layer, and transferred to a decoder. At this time, a quantization parameter used in each layer is a value obtained by subtracting 6 from a quantization parameter used in the lower layer.

In this example, SNR scalability is provided by iterative quantization of the residual signals computed between the original subband pictures and the reconstructed subband pictures obtained after decoding the SNR base layer and previous SNR enhancement layers.

In the video encoding method supporting picture-quality scalability illustrated in FIG. 1, quantization is performed using the following Equation 1.

$$|Z_{ij}|=(|W_{ij}|*MF+f)>>qbits \quad (a)$$

$$sign(Z_{ij})=sign(W_{ij}) \quad (b) \quad (1)$$

In Equation 1, $Z_{ij}$ denotes a quantized coefficient, $W_{ij}$ denotes a DCT-transformed result, MF denotes a multiplication factor, f denotes a rounding offset, and >> denotes a right binary shift. In the H.264-based reference model software, f is $2^{qbit}/3$ with respect to an intra block, and $2^{qbit}/6$ with respect to an inter block.

In the video encoding method supporting picture-quality scalability, dequantization is performed using the following Equation 2.

$$W'_{ij}=Z_{ij}V_{ij}2^{floor(QP/6)} \quad (2)$$

If quantization intervals based on the conventional H.264 standard are used, Equation 2 can be applied to an image encoding method supporting picture-quality scalability.

However, in the conventional H.264-based quantization method non-integer numbers are rounded to the nearest integer. Thus, it is impossible to extract the original non-integer number from the rounded integer is impossible, which causes an irreversible loss.

That is, the quantization and dequantization using Equations 1 and 2 do not follow a distribution of Discrete Cosine Transform (DCT) coefficients of each slice, and cannot obtain optimal quantization intervals and reconstruction values. Accordingly, encoding efficiency is low.

Figure 2:
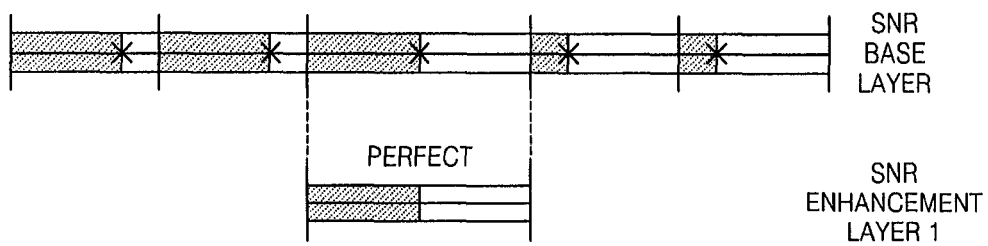
FIG. 2 is a view for explaining cases in which a rounding artifact is generated in a JSVM progressive quantization method.
Figure 2:
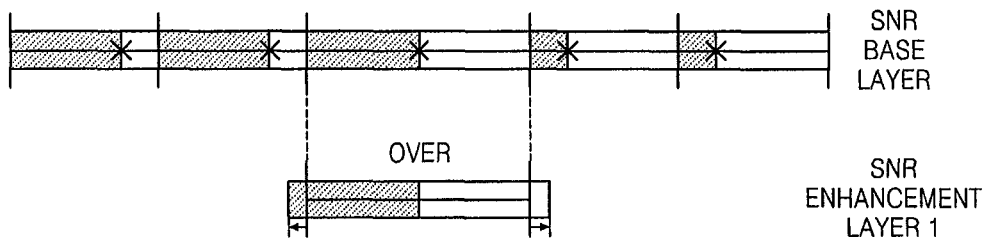
Figure 2:
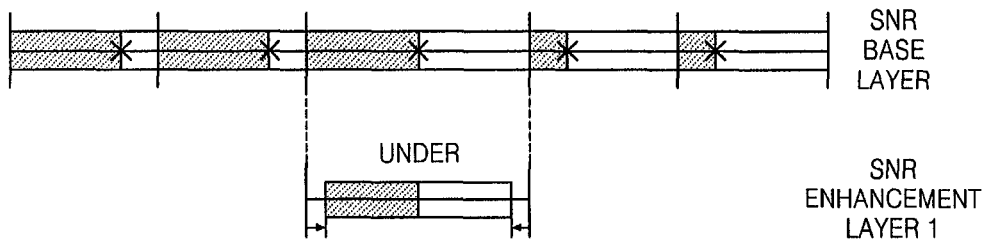

FIG. 2 is a diagram for explaining cases in which a rounding artifact is generated in a JSVM progressive quantization method.

As illustrated in FIG. 2, in the JSVM progressive quantization method, due to the rounding artifact, quantization intervals are not perfectly embedded.

(a) in FIG. 2 illustrates a case where a quantization interval of a SNR enhancement layer is perfectly embedded in a quantization interval of a SNR base layer. Meanwhile, (b) and (c) in FIG. 2 illustrate cases where there is a difference between a quantization interval of a SNR base layer and a quantization interval of a SNR enhancement layer due to a rounding artifact. That is, the difference between the coefficients of input residues of a current layer and dequantized coefficients of a current layer and the coefficients of input residues of the next enhancement layer is likely not to be coherent.

An effect of the rounding artifact will be described in detail with reference to FIG. 3, below.

Figure 3:
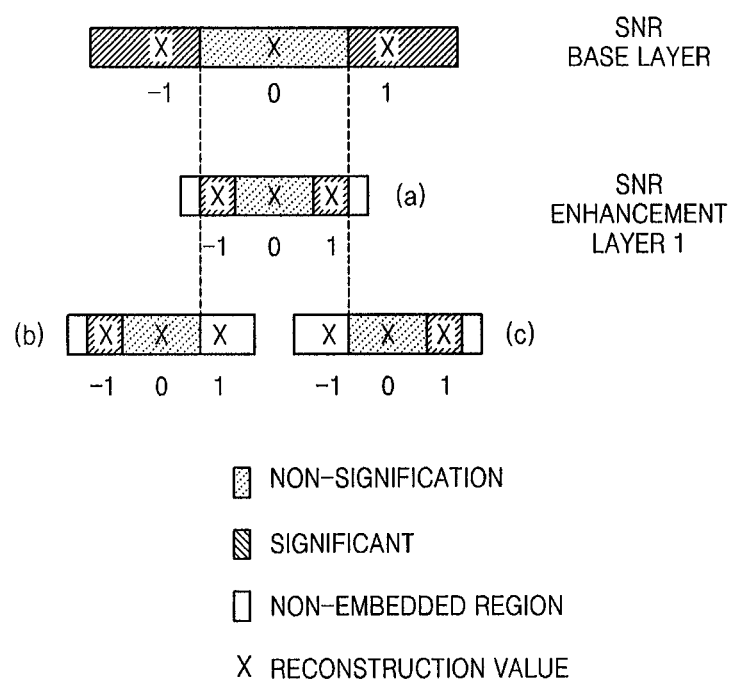
FIG. 3 is a view for more explaining a rounding artifact effect in more detail.

Referring to FIG. 3, a part of values encoded to "1" in a SNR base layer can be mapped to "−1" in a SNR enhancement layer, due to the rounding artifact effect. Also, a part of values encoded to "−1" in the SNR base layer can be mapped to "1" in the SNR enhancement layer, due to the round artifact effect.

Figure 4:
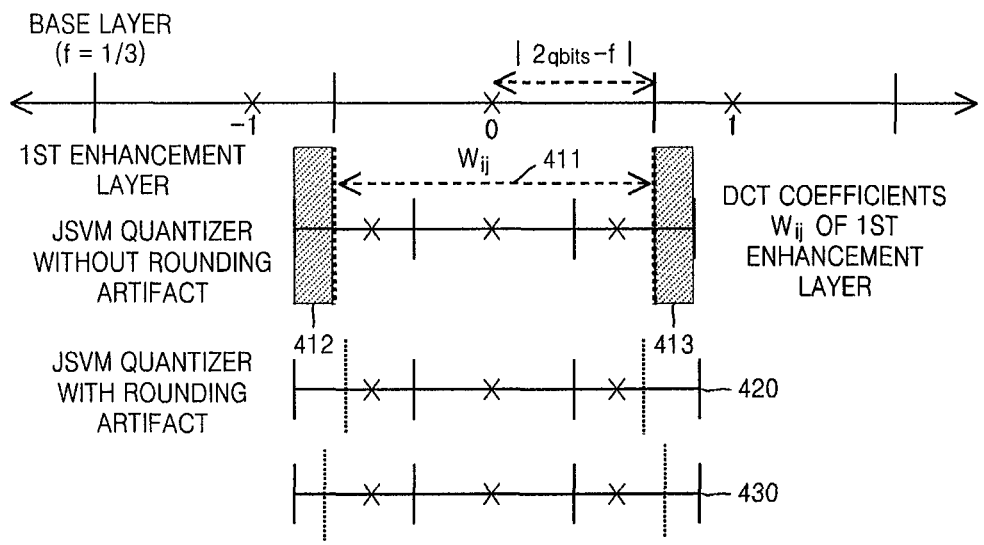
FIG. 4 is a view for explaining non-significant quantization based on the JSVM 1.0 standard.

FIG. 4 is a diagram for explaining non-significant quantization based on the conventional JSVM 1.0 standard.

A case where a quantized DCT coefficient in a base layer is "0" is called "non-significant". In this case, the DCT coefficient of the corresponding enhancement layer must be located in an area 411 illustrated in FIG. 4.

However, when quantization or dequantization is performed using Equations 1 and 2, the DCT coefficient of the enhancement layer may be found in areas 412 and 413 as shown in FIG. 4. Also, due to the rounding artifact, it is difficult to correctly estimate intervals in which quantized DCT coefficients are located (420, 430).

Figure 5:
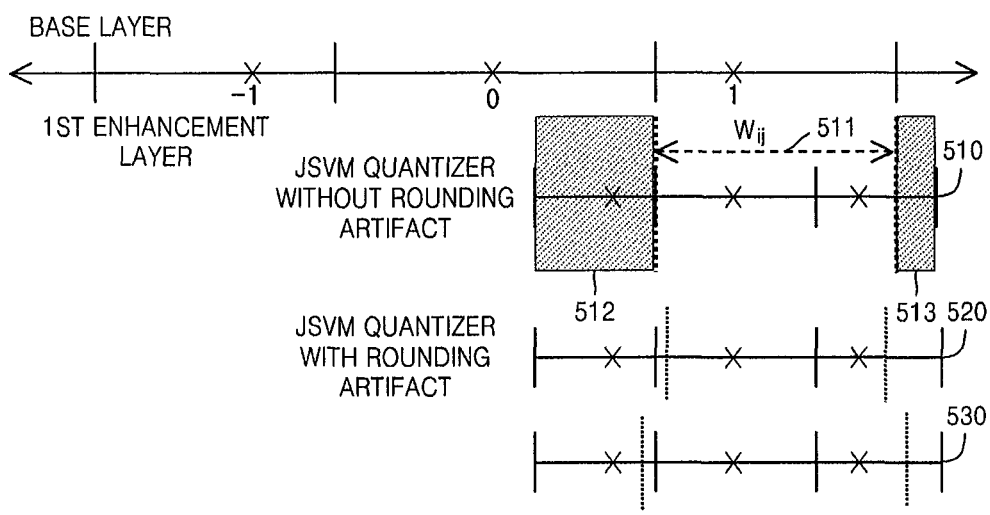
FIG. 5 is a view for explaining significant quantization based on the JSVM 1.0 standard.

FIG. 5 is a view for explaining significant quantization based on the conventional JSVM 1.0 standard.

A case where a quantized DCT coefficient in a base layer is 1 is called "significant". In this case, the DCT coefficient of the corresponding enhancement layer must be located in an area 511 illustrated FIG. 5. However, like the case illustrated in FIG. 4, when quantization or dequantization is performed using Equations 1 and 2, the DCT coefficient of the enhancement layer may be found in areas 512 and 513 as illustrated in FIG. 5. Also, due to the rounding artifact, intervals in which quantized DCT coefficients are located become narrower (520) or wider (530).

The above-described problems are solved in the method according to the present invention by obtaining a distribution of DCT coefficients of each quantization interval and assigning DCT coefficients of the corresponding frame to optimal quantization intervals using Rate-Distortion (R-D) optimization, thus making it possible to provide high coding efficiency.

Figure 6:
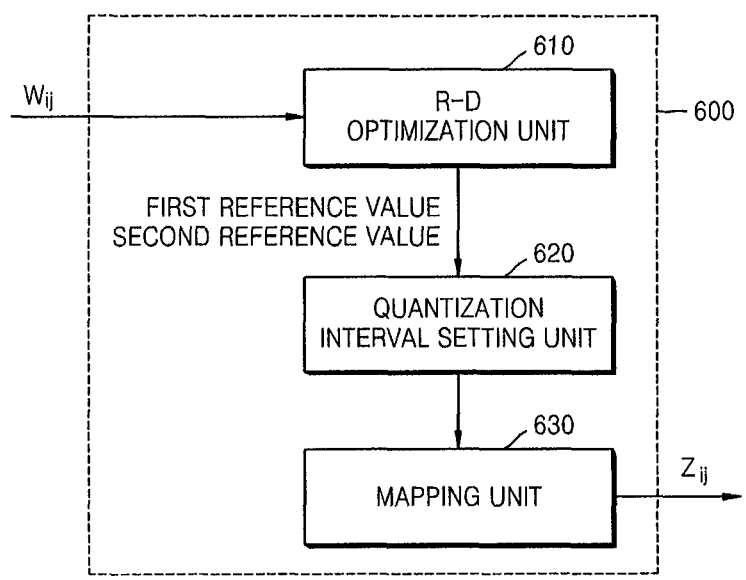
FIG. 6 is a block diagram of a quantization apparatus for providing improved SNR scalability, according to an embodiment of the present invention.

FIG. 6 is a block diagram of a quantization apparatus 600 for providing improved SNR scalability, according to an embodiment of the present invention.

The quantization apparatus 600 includes an R-D optimization unit 610, a quantization interval setting unit 620, and a mapping unit 630.

The R-D optimization unit 610 performs R-D optimization on the basis of a distribution of DCT coefficients of each slice and calculates a first reference value and a second reference value respectively indicating a start point and an end point of a range of DCT coefficients quantized to "0".

In more detail, the R-D optimization unit 610 calculates a first reference value and a second reference value which minimize a cost function J=D+λ R. Here, D denotes an average distortion value, R denotes an average bit rate, and λ denotes a Lagrange multiplier. The D and R values are expressed as follows.

$$D = \sum_{k=0}^{2} \sum_{x_k \in (\alpha_k, \alpha_{k+1})} (x_k - \delta_k)^2 p_k,$$

and $$R = -\sum_{k=0}^{2} p_k \log(p_k),$$

where, $$p_k = n_k / N,$$

$$p_{x_i} = n_{x_i} / N,$$

and $$\delta_k = \sum_{x_i \in (\alpha_k, \alpha_{k+1})} x_l / n_k$$

Here, N denotes the total number of $W_{ij}$, and $n_k$ denotes the number of $W_{ij}$ in a range $[\alpha_k, \alpha_{k+1}]$. A process for calculating the first reference value and the second reference value will be described in detail later with reference to FIGS. 7 and 8.

The quantization interval setting unit 620 sets adaptive quantization intervals, on the basis of minimum and maximum values of the DCT coefficients and the first and second reference values calculated by the R-D optimization unit 610. In this case, if the minimum value of the DCT coefficients is $\alpha_0$, the maximum value of the DCT coefficients is $\alpha_3$, the first reference value is $\alpha_1$, and the second reference value is $\alpha_2$, the adaptive quantization interval can be obtained as illustrated in (b) of FIG. 9.

After the first reference value $\alpha_1$ and the second reference value $\alpha_2$ are calculate d, three intervals (that is, $[\alpha_0, \alpha_1]$, $[\alpha_1, \alpha_2]$, and $[\alpha_2, \alpha_3]$) of $W_{ij}$ quantized to "1", "0", and "−1" are determined. That is, reconstruction values $\delta_1$, $\delta_2$, and $\delta_3$ of the intervals $[\alpha_0, \alpha_1]$, $[\alpha_1, \alpha_2]$, and $[\alpha_2, \alpha_3]$ are average values of $W_{ij}$ in the respective intervals $[\alpha_0, \alpha_1]$, $[\alpha_1, \alpha_2]$, and $[\alpha_2, \alpha_3]$.

The mapping unit 630 maps the DCT coefficients to the adaptive quantization intervals, thereby performing quantization. In detail, coefficients from the minimum value $\alpha_0$ of the DCT coefficients to the first reference value $\alpha_1$ are mapped to "−1", coefficients from the second reference value $\alpha_2$ to the maximum value $\alpha_3$ of the DCT coefficients are mapped to "1", and the remaining coefficients are mapped to "0".

$$Z_{ij} = \begin{cases} -1, & \alpha_0 \leq W_{ij} < \alpha_1 \\ 0, & \alpha_1 \leq W_{ij} < \alpha_2 \\ 1, & \alpha_2 \leq W_{ij} < \alpha_3 \end{cases}$$

Figure 7:
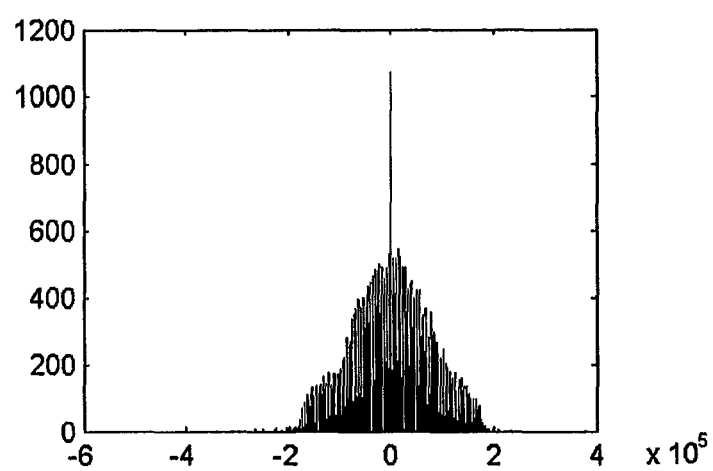
FIG. 7 is a graph showing a distribution of Discrete Cosine Transform (DCT) coefficients.

FIG. 7 is a graph showing a distribution of the DCT coefficients $W_{ij}$.

In FIG. 7, an x axis corresponds to values of the DCT coefficients $W_{ij}$, and a y axis corresponds to the number of the DCT coefficients $W_{ij}$.

Figure 8:
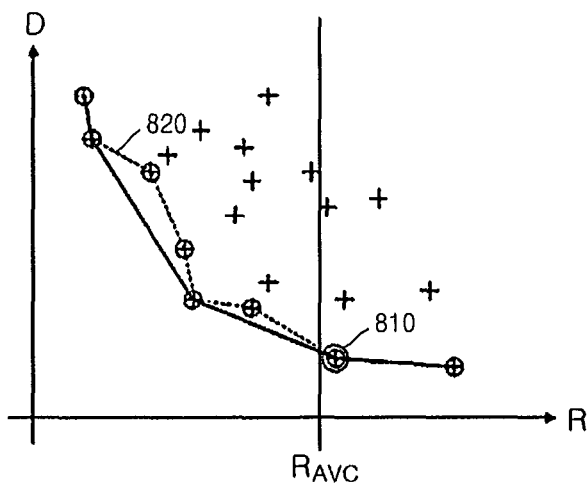
FIG. 8 is a graph used to calculate reference values, according to an embodiment of the present invention.

FIG. 8 is a graph used to calculate reference values, according to an embodiment of the present invention.

Referring to FIGS. 6, 7, and 8, the R-D optimization unit 610 searches for a distribution histogram of DCT coefficients $W_{ij}$ of enhancement layer of each fine granularity scalability (FGS). Then, the R-D optimization unit 610 calculates a first reference value $\alpha_1$ and a second reference value $\alpha_2$ so that $R \leq R_{AVC}$ is satisfied and a cost function J=D+Λ R is minimized, based on a distribution of DCT coefficients of each slice. Here, $R_{AVC}$ means entropy obtained by reconstruction values and step sizes of a conventional quantization method.

The average distortion value D and the average bit rate R are obtained by varying the first reference value $\alpha_1$ from 0 to the minimum value $\alpha_0$ of the DCT coefficients and varying the second reference value $\alpha_2$ from 0 to the maximum value $\alpha_3$ of the DCT coefficients.

FIG. 8 shows R and D values obtained according to the minimum value $\alpha_0$ of the DCT coefficients and the first reference value $\alpha_1$. In FIG. 8, values which minimize the cost function value J are connected by a solid line. A point which satisfies $R \leq R_{AVC}$ of the values is a point 810. Accordingly, the first reference value $\alpha_1$ and the minimum value $\alpha_0$ of DCT coefficients indicate R and D values corresponding to the point 810.

By calculating the first reference value $\alpha_1$ and the second reference value $\alpha_2$ through R-D optimization using the method according to the present invention, a value f which decides the size of a dead-zone varies instead of being fixed as in a conventional method. That is, $f=2^{qbit}+\alpha_1$ when $W_{ij}$ is a positive number and $f=2^{qbit}-\alpha_2$ when $W_{ij}$ is a negative number, wherein qbit=15+floor($Q^{P/6}$).

Figure 9:
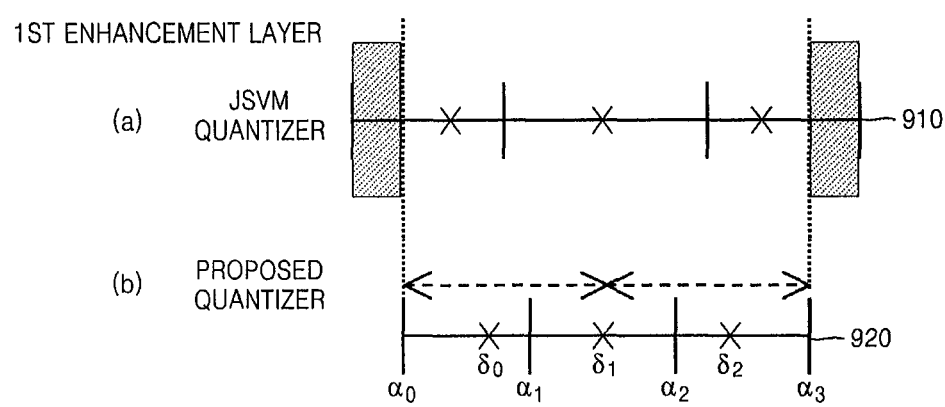
FIG. 9 is a view for explaining a process in which quantization intervals and reconstruction values are calculated through Rate-Distortion (R-D) optimization from a distribution of DCT coefficients, according to an embodiment of the present invention.

FIG. 9 is a diagram for explaining an example in which reconstruction values and quantization intervals which minimize a cost function J=D+λ R are obtained by performing R-D optimization, from the distribution of the DCT coefficients.

As illustrated in (a) of FIG. 9, a conventional JSVM quantizer is manufactured under an assumption that DCT coefficients exist in an area 910. However, actually, DCT coefficients of SNR enhancement layers can exist only in an area 920.

Accordingly, the present invention provides a quantization apparatus, which is capable of adaptively setting quantization intervals, considering only parts in which DCT coefficients of SNR enhancement layers actually exist, thereby achieving higher encoding efficiency than the conventional JSVM quantization apparatus.

Figure 10:
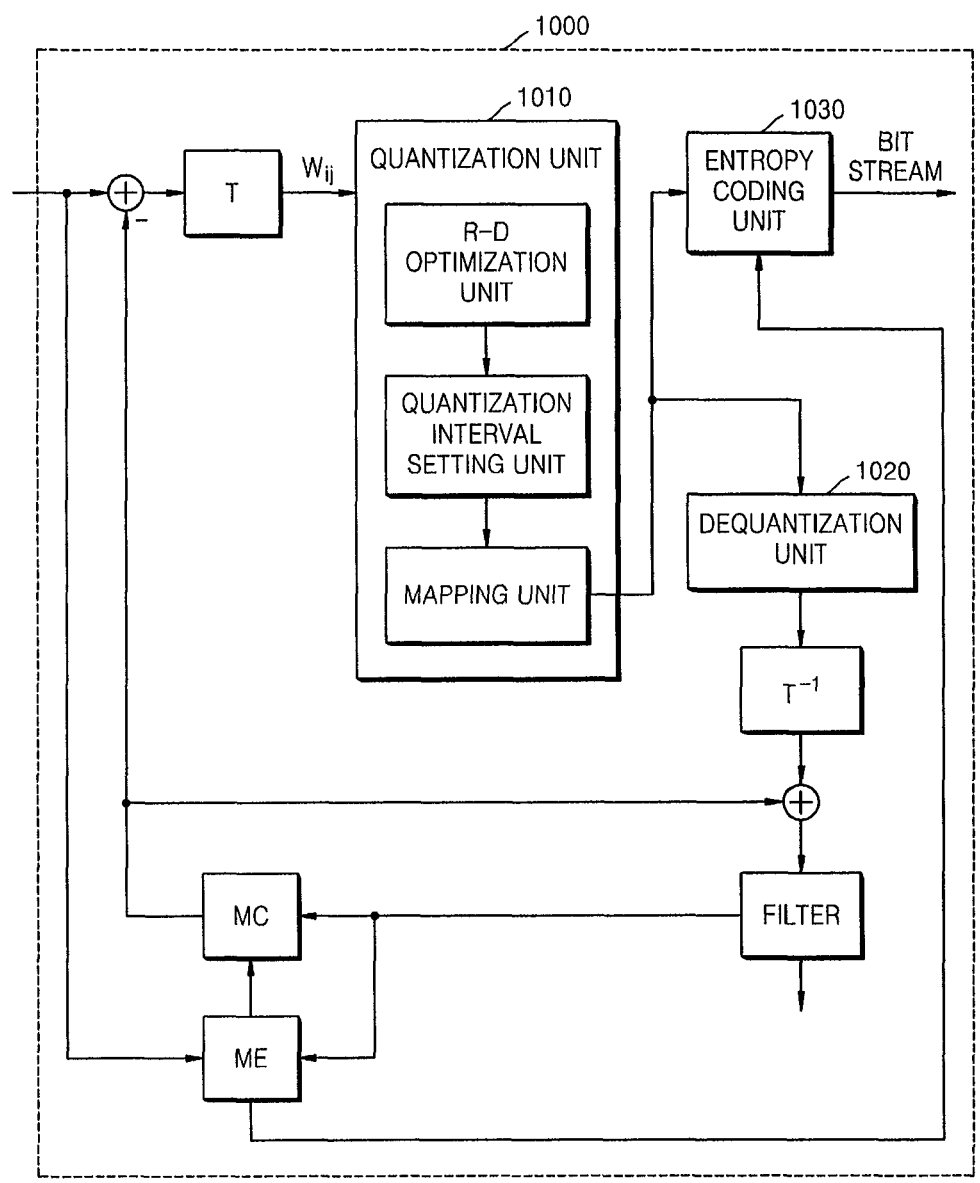
FIG. 10 is a block diagram of an encoder including a quantization unit for providing improved SNR scalability, according to an embodiment of the present invention.

FIG. 10 is a block diagram of an encoder 1000 including a quantization unit for providing improved SNR scalability, according to an embodiment of the present invention.

The encoder 1000 includes a quantization unit 1010, a dequantization unit 1020, and an entropy coding unit 1030.

The quantization unit 1010 performs R-D optimization based on a distribution of DCT coefficients of each slice, calculates quantization coefficient values and reference values indicating a start value and an end value of DCT coefficients quantized to "0", and performs quantization.

In this case, the function and technical concept of the quantization unit 1010 is the same as that of the quantization apparatus 600 described above with reference to FIG. 6, and therefore, a detailed description thereof will be omitted. The entropy coding unit 1030 encodes $$Y = \frac{\sigma - 2^{15+floor(Q^{P/6})}}{2^{15+floor(Q^{P/6})}}$$

without encoding $\delta_j$ in order to reduce the number of bits to be transmitted.

The dequantization unit 1020 performs dequantization using Equation 3, on the basis of values $Z_{ij}$ encoded by the quantization unit 1010 and average values $\delta_0$, $\delta_1$, and $\delta_2$ of DCT coefficients of respective intervals, wherein $\delta_0$ is an average value of DCT coefficients in the interval $[\alpha_0, \alpha_1]$, $\delta_1$ is an average value of DCT coefficients in the interval $[\alpha_1, \alpha_2]$, and $\delta_2$ is an average value of DCT coefficients in the interval $[\alpha_2, \alpha_3]$.

$$W_{ij}' = (Z_{ij} + Y_k) V_{ij} 2^{floor(QP/6)} \quad (3)$$

In this case, $$Y = \frac{\sigma - 2^{15+floor(Q^{P/6})}}{2^{15+floor(Q^{P/6})}},$$

and k are decided by the following Equation 4.

$$k = \begin{cases} 0, & Z_{ij} = -1 \\ 1, & Z_{ij} = 0 \\ 2, & Z_{ij} = 1 \end{cases} \quad (4)$$

A codec (not illustrated) for providing improved SNR scalability using the quantization method according to the present invention, includes an encoder and a decoder. The encoder includes an R-D optimization unit, a quantization interval setting unit, a mapping unit, and an entropy encoder. The decoder includes a dequantization unit.

A technical concept for quantizing DCT coefficients through the R-D optimization unit, the quantization interval setting unit, and the mapping unit is described above with reference to FIG. 6, and therefore, a detailed description thereof is omitted.

The entropy encoder adds, to a bit stream, compressed values $$Y = \frac{\sigma - 2^{15+floor(Q^{P/6})}}{2^{15+floor(Q^{P/6})}}$$

of the DCT coefficient average values $\delta_0$, $\delta_1$, and $\delta_2$ of the respective sections divided based on the first reference value and the second reference value in the adaptive quantization intervals set by the quantization interval setting unit, with respect to the DCT coefficients quantized through the mapping unit. The entropy encoder encodes and transmits the compression values $$Y = \frac{\sigma - 2^{15+floor(Q^{P/6})}}{2^{15+floor(Q^{P/6})}}$$

without encoding $\delta_j$, in order to reduce the number of bits to be transmitted.

In the decoder, the dequantization unit performs dequantization based on the quantization coefficients $Z_{ij}$ and the DCT coefficient average values $\delta_0$, $\delta_1$, and $\delta_2$ extracted from the bit stream.

Figure 11:
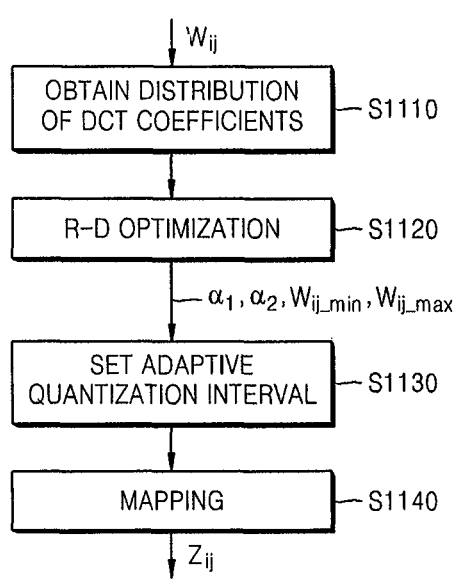
FIG. 11 is a flowchart illustrating a quantization method, according to an embodiment of the present invention.

FIG. 11 is a flowchart illustrating a quantization method, according to an embodiment of the present invention.

Referring to FIGS. 10 and 11, a distribution of DCT coefficients of each slice received through the quantization unit 1010 of the encoder 1000 is obtained (operation S1110). Then, R-D optimization is performed based on the obtained distribution of the DCT coefficients, so that a first reference value $\alpha_1$ and a second reference value $\alpha_2$ indicating a start value and an end value of a range of DCT coefficients quantized to "0" are calculated (operation S1120).

Then, quantization interval setting for setting adaptive quantization intervals based on a minimum value $W_{ij\_min}$ and a maximum value $W_{ij\_max}$ of the DCT coefficients, the first reference value $\alpha_1$, and the second reference value $\alpha_2$, is performed (operation S1130). Thereafter, mapping for mapping the DCT coefficients to the adaptive quantization intervals is performed (operation S1140). In operation S1140, coefficients from the minimum value $W_{ij\_min}$ of the DCT coefficients to the first reference value $\alpha_1$ are mapped to "−1", coefficients from the second reference value $\alpha_2$ to the maximum value $W_{ij\_max}$ of the DCT coefficients are mapped to "1", and the remaining coefficients are mapped to "0".

Figure 12:
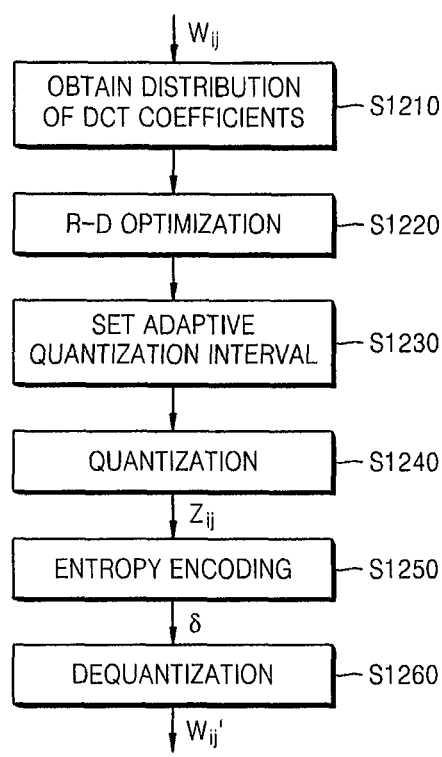
FIG. 12 is a flowchart illustrating a quantization and dequantization method, according to an embodiment of the present invention.
Figure 13:
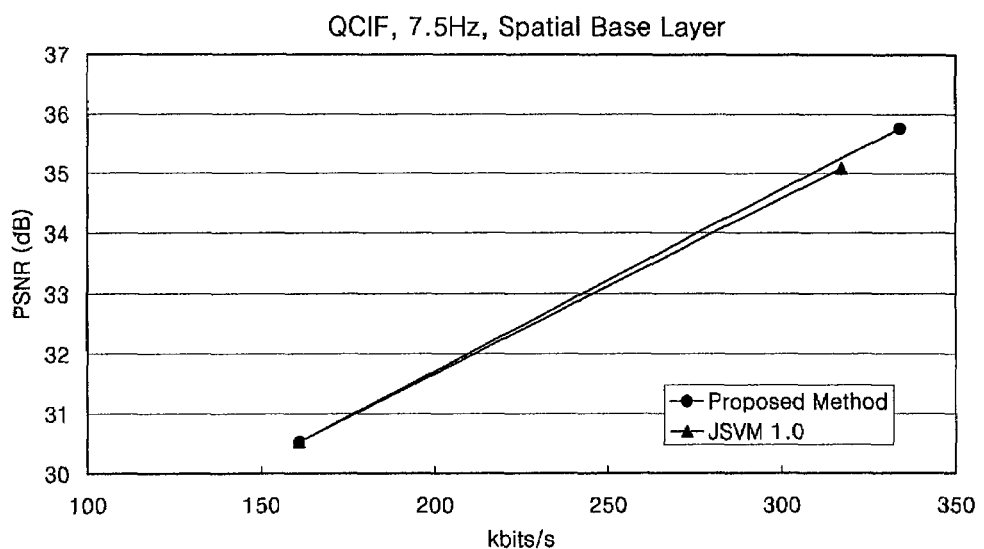
FIGS. 13 through 19 are graphs showing effects obtained by the methods according to the present invention.
Figure 14:
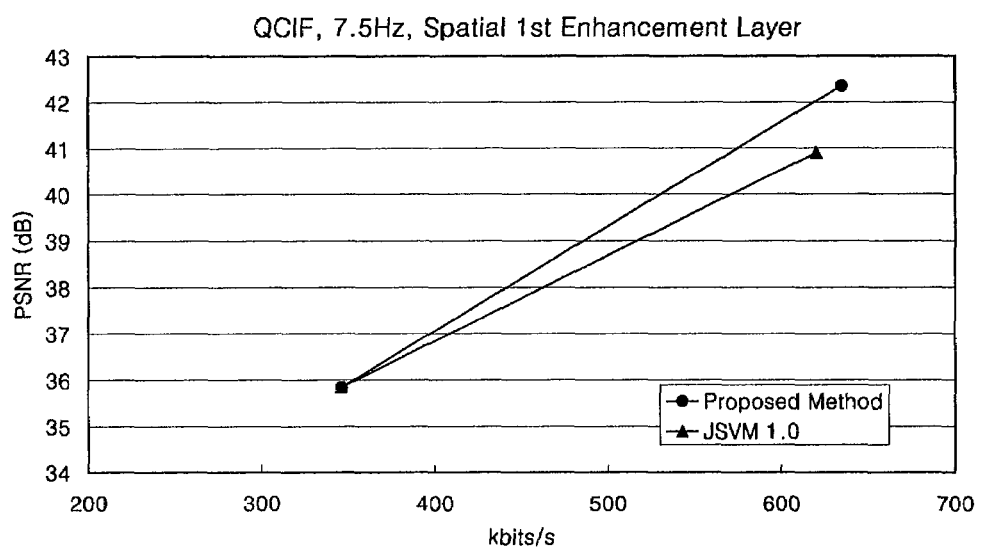
Figure 15:
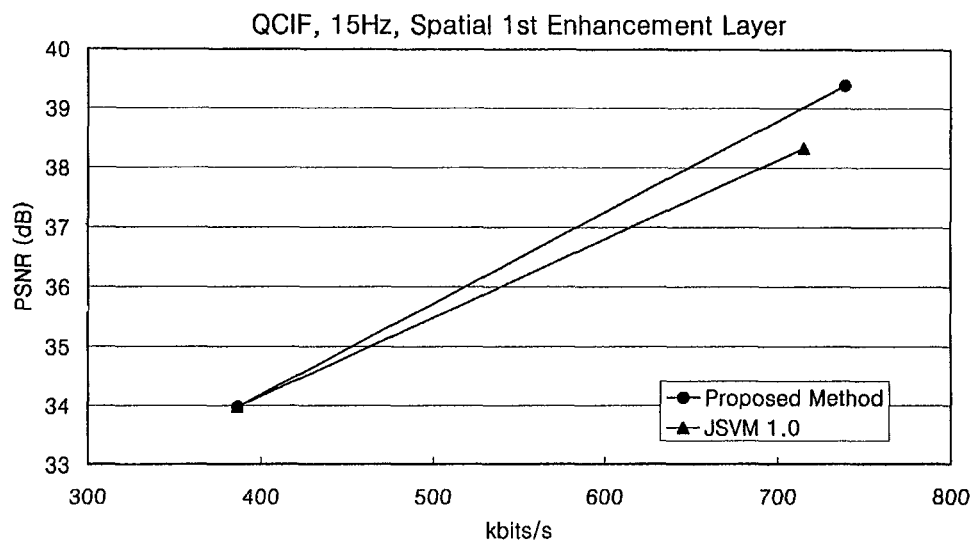
Figure 16:
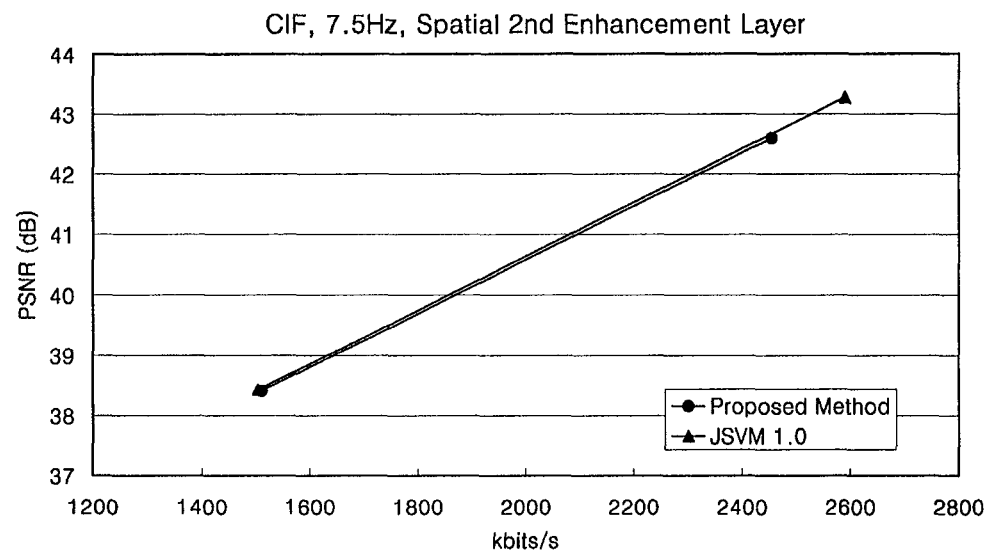

FIG. 12 is a flowchart illustrating a quantization and dequantization method, according to an embodiment of the present invention.

A coding method for providing SNR scalability includes quantization by an encoder and dequantization by a decoder.

First, R-D optimization is performed based on a distribution of DCT coefficients of each slice, quantization coefficient values and reference values indicating a start value and an end value of a range of DCT coefficients quantized to "0" are calculated, and then quantization is performed.

In more detail, R-D optimization is performed based on a distribution of DCT coefficients of each slice, R-D optimization (operation S1220) for calculating a first reference value and a second reference value indicating a start value and an end value of a range of DCT coefficients to be quantized to "0" is performed, and then quantization interval setting (operation S1230) for setting adaptive quantization intervals on the basis of the maximum and minimum values of the DCT coefficients and the first and second reference values calculated in the operation S1220 is performed.

Coefficients from the minimum value of the DCT coefficients to the first reference value are mapped to "−1", coefficients from the second reference value to the maximum value of the DCT coefficients are mapped to "1", and the remaining coefficients are mapped to "0", thereby performing quantization (operation S1240).

Thereafter, entropy encoding (operation S1250) for adding to a bit stream values encoded on the basis of average values of DCT coefficients of respective intervals divided according to the reference values, is performed, and the bit stream is transferred to the decoder.

In the decoder, dequantization is performed (operation S1260). That is, reconstruction values $\delta_0$, $\delta_1$, and $\delta_2$ are calculated on the basis of $$Y = \frac{\sigma - 2^{15+floor(Q^{P/6})}}{2^{15+floor(Q^{P/6})}}$$

information included in the bit stream, and dequantization is performed using Equations 3 and 4 (operation S1260).

FIGS. 13 through 19 are graphs illustrating results obtained using the methods according to the present invention.

FIGS. 13 through 19 show results when a FGS layer is stacked on the corresponding layer in image format. Frame rate conditions are denoted above each graph.

In FIGS. 13 through 19, left and lower points are rate distortion points of a base layer, and right and upper points are rate distortion points of a first FGS layer.

Figure 17:
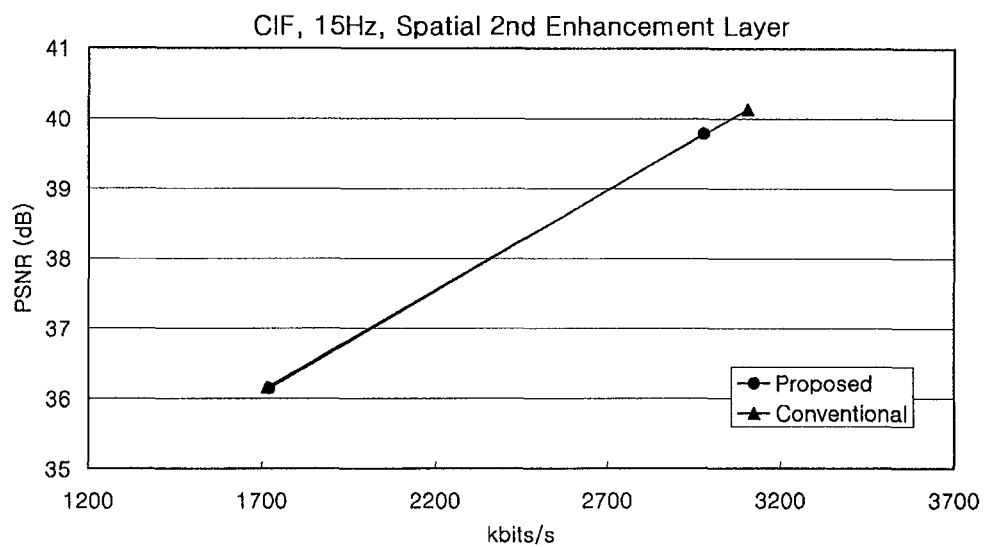
Figure 18:
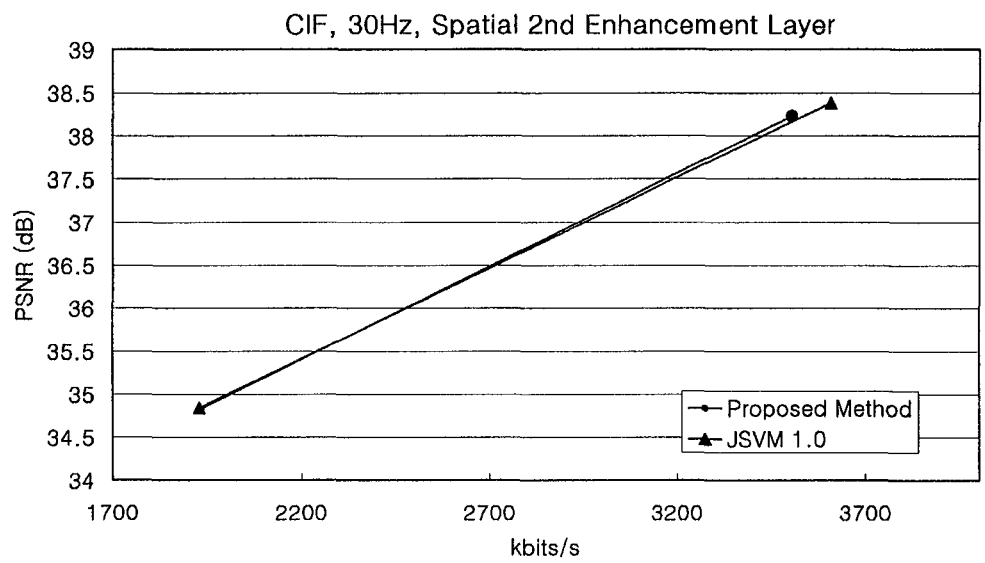
Figure 19:
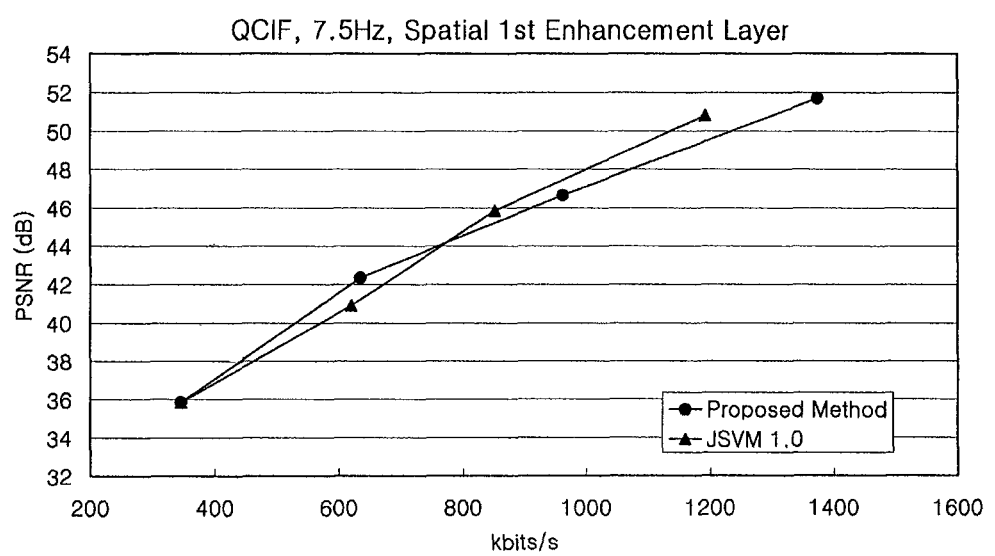

In FIGS. 17, 18, and 19, the proposed method has characteristics almost identical to the conventional method. However, in FIGS. 13, 14, and 15, the proposed method has performance improved by about 0.1 dB, by about 1 dB, and by about 0.8 dB, respectively, compared to the conventional method.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

As described above, according to the present invention, by optimally calculating quantization intervals and reconstruction values through a distribution of DCT coefficients of each frame and performing encoding and decoding, when DCT coefficients of each SNR enhancement layer are quantized in scalable video coding, high coding efficiency can be achieved.

The invention claimed is:

1. A quantization apparatus providing improved Signal-to-Noise Ratio (SNR) scalability, comprising:
an R-D optimization unit performing Rate-Distortion (R-D) optimization based on a distribution of Discrete Cosine Transform (DCT) coefficients of each slice and calculating a first reference value and a second reference value respectively indicating a start point and an end point of DCT coefficients quantized to "0",
wherein the distribution of DCT coefficients are configured to generate an average distortion value and an average bit rate, and
wherein the each slice is a slice of an image frame as specified by H.264 video compression standard;
a quantization interval setting unit setting adaptive quantization intervals based on of a minimum value and a maximum value of the DCT coefficients, the first reference value, and the second reference value, and
wherein the minimum value is less than the calculated first reference value, and
wherein the maximum value is greater than the calculated second reference value; and
a mapping unit mapping the DCT coefficients to the adaptive quantization intervals, and
wherein the average distortion value and the average bit rate are configured to be generated based on to the minimum value and the first reference value.

2. The quantization apparatus of claim 1, wherein the R-D optimization unit calculates the first reference value and the second reference value so that a cost function J=D+λ R is minimized, where D denotes the average distortion value, R denotes the average bit rate, and λ denotes a Lagrange multiplier.

3. The quantization apparatus of claim 1, wherein the mapping unit maps coefficients from the minimum value of the DCT coefficients to the first reference value to "−1", coefficients from the second reference value to the maximum value of the DCT coefficients to "1", and the remaining coefficients to "0".

4. An encoder providing SNR scalability, comprising:
a quantization unit performing R-D optimization based on a distribution of DCT coefficients of each slice, calculating quantization coefficient values and reference values respectively indicating a start value and an end value of DCT coefficients quantized to "0", and performing quantization; and
a dequantization unit performing dequantization based on average values of DCT coefficients of respective intervals divided according to the reference values and the quantization coefficient values, and
wherein the distribution of DCT coefficients is configured to generate an average value, and
wherein the average value of the DCT coefficients is configured according to the reference values are σ, and compressed values of the average values are Y, $$Y = \frac{\sigma - 2^{15+floor(Q^{P/6})}}{2^{15+floor(Q^{P/6})}}.$$

5. The encoder of claim 4, wherein the quantization unit comprises:
an R-D optimization unit performing R-D optimization based on a distribution of DCT coefficients of each slice and calculating a first reference value and a second reference value respectively indicating a start point and an end point of DCT coefficients quantized to "0", and
wherein the each slice is a slice of an image frame as specified by H.264 video compression standard;
a quantization interval setting unit setting adaptive quantization intervals based on a minimum value and a maximum value of the DCT coefficients, the first reference value, and the second reference value; and
a mapping unit mapping the DCT coefficients to the adaptive quantization intervals.

6. The encoder of claim 5, wherein the R-D optimization unit calculates the first reference value and the second reference value so that a cost function J=D+λ R is minimized, where D denotes an average distortion value, R denotes an average bit rate, and λ denotes a Lagrange multiplier.

7. The encoder of claim 5, wherein the mapping unit maps coefficients from the minimum value of the DCT coefficients to the first reference value to "−1", coefficients from the second reference value to the maximum value of the DCT coefficients to "1", and the remaining coefficients to "0".

8. The encoder of claim 4, further comprising an entropy encoding unit adding, to a bit stream, values encoded based on the average values of DCT coefficients of respective intervals divided according to the reference values.

9. The encoder of claim 8, wherein the average values of the DCT coefficients of the respective intervals divided according to the reference values are σ, and the compressed values of the average values are Y, $$Y = \frac{\sigma - 2^{15+floor(QP/6)}}{2^{15+floor(QP/6)}}.$$

10. A codec providing improved SNR scalability, comprising:
an R-D optimization unit performing R-D optimization based on a distribution of DCT coefficients of each slice and calculating a first reference value and a second reference value respectively indicating a start point and an end point of DCT coefficients quantized to "0" and
wherein the each slice is a slice of an image frame as specified by H.264 video compression standard;
a quantization interval setting unit setting adaptive quantization intervals based on a minimum value and a maximum value of the DCT coefficients, the first reference value, and the second reference value;
a mapping unit mapping the DCT coefficients to the adaptive quantization intervals;
an entropy encoding unit adding, to a bit stream, values encoded based on average values of DCT coefficients of respective intervals divided according to the reference values, and
wherein the average values are configured to be generated based on to the minimum value and the first reference value of the DCT coefficient; and
a dequantization unit performing dequantization based on both the average value of the DCT coefficients and quantization coefficient values extracted from the bit stream.

11. A dequantization apparatus, wherein quantization coefficient values and average values of DCT coefficients of respective intervals divided on the basis of a start point and an end point of a range of DCT coefficients quantized to "0", in quantization intervals set based on a distribution of the DCT coefficients, are extracted from an encoded bit stream, and dequantization is performed, and
wherein the quantization intervals are set on the basis of a start point and an end point of a range of DCT coefficients quantized to "0" extracted by performing R-D optimization based on a maximum value and a minimum value of the DCT coefficients and the distribution of the DCT coefficients, and
wherein the distribution of DCT coefficients are configured to generate an average distortion value and an average bit rate, and
wherein the average distortion value and the average bit rate are configured to be generate based on to the minimum value and a first reference value.

12. The dequantization apparatus of claim 11, wherein the R-D optimization is to calculate the first reference value and a second reference value so that a cost function J=D+λ R is minimized, where D denotes the average distortion value, R denotes an average bit rate, and λ denotes a Lagrange multiplier.

13. A decoder providing improved SNR scalability comprising:
a receiver receiving an encoded bit stream;
an extractor extracting a DCT coefficient average value and a quantization coefficient value from the received bit stream; and
a dequantization unit performing dequantization on the basis of the DCT coefficient average value and the quantization coefficient value,
wherein the DCT coefficient average value of each section of adaptive quantization intervals is an average value of DCT coefficient present in a corresponding section, and the sections of the adaptive quantization interval are set using a maximum value and a minimum value of the DCT coefficients of the residues of each SNR enhancement and a start point and an end point of a range of DCT coefficients to be quantized to "0", the start point and the end point being extracted by performing R-D optimization,
wherein the DCT coefficients generate an average distortion value and an average bit rate
wherein the R-D optimization calculates a first reference value and a second reference value,
wherein the minimum value is less than the calculated first reference value, and
wherein the maximum value is greater than the calculated second reference value, and
wherein the average distortion value and the average bit rate are based on to the minimum value and the first reference value.

14. The decoder of claim 13, wherein the R-D optimization that calculated the first reference value and the second reference value is used so that a cost function J=D+λ R is minimized, where D denotes the average distortion value, R denotes the average bit rate, and λ denotes a Lagrange multiplier.

15. A quantization method providing improved SNR scalability comprising:
performing R-D optimization based on a distortion of DCT coefficients of each slice and calculating a first reference value and a second reference value respectively indicating a start point and an end point of DCT coefficients quantized to "0",
wherein the distribution of DCT coefficients generate an average distortion value and an average bit rate, and
wherein the each slice is a slice of an image frame as specified by H.264 video compression standard;
setting adaptive quantization intervals based on of a minimum value and a maximum value of the DCT coefficients, the first reference value, and the second reference value, and
wherein the minimum value is less than the calculated first reference value, and
wherein the maximum value is greater than the calculated second reference value; and
mapping the DCT coefficients to the adaptive quantization intervals, and
wherein the average distortion value and the average bit rate are generated based on to the minimum value and the first reference value.

16. The quantization method of claim 15, wherein the R-D optimization is to calculate the first reference value and the second reference value so that a cost function J=D+λ R is minimized, where D denotes the average distortion value, R denotes the average bit rate, and λ denotes a Lagrange multiplier.

17. The quantization method of claim 15, wherein, in the mapping, coefficients from the minimum value of the DCT coefficients to the first reference value are mapped to "−1", coefficients from the second reference value to the maximum value of the DCT coefficients are mapped to "1", and the remaining coefficients are mapped to "0", respectively.

18. A coding method of providing improved SNR scalability, comprising:
performing quantization after calculating by performing R-D optimization on the basis of a distribution of DCT coefficients of each slice, calculating quantization coefficient values and reference values respectively indicating a start point and an end point of a range of DCT coefficients quantized to "0"; and performing dequantization on the basis of average values of DCT coefficients of each section divided based on the reference values and the quantization coefficient values,
entropy encoding for adding, to a bit stream, values encoded based on average values of DCT coefficients of each of sections divided according to the first and second reference values, and
wherein the average values of the DCT coefficients of each of sections divided according to the first and second reference values are σ, and compressed values of the average values are Y, $$Y = \frac{\sigma - 2^{15+floor(QP/6)}}{2^{15+floor(QP/6)}}.$$

19. The coding method of claim 18, wherein the performing of the quantization comprises:
performing R-D optimization based on a distortion of DCT coefficients of each slice and calculating a first reference value and a second reference value respectively indicating a start point and an end point of DCT coefficients quantized to "0", and
wherein the each slice is a slice of an image frame as specified by H.264 video compression standard;
setting adaptive quantization intervals on the basis of a minimum value and a maximum value of the DCT coefficients, the first reference value, and the second reference value; and
mapping the DCT coefficients to the adaptive quantization intervals.

20. The coding method of claim 19, wherein the R-D optimization is to calculate the first reference value and the second reference value so that a cost function J=D+λ R is minimized, where D denotes an average distortion value, R denotes an average bit rate, and λ denotes a Lagrange multiplier.

21. The coding method of claim 19, wherein, in the mapping, coefficients from a minimum value of the DCT coefficients to the first reference value are mapped to "−1", coefficients from the second reference value to a maximum value of the DCT coefficients are mapped to "1", and the remaining coefficients are mapped to "0".

22. A dequantization method providing improved SNR scalability, comprising:
extracting a quantization coefficient value and a DCT coefficient average value of each of sections divided on the basis of a start point and an end point of a range of DCT coefficients quantized to "0", in an adaptive quantization interval set based on a distribution of the DCT coefficients, from an encoded bit stream,
wherein the adaptive quantization interval is set using a maximum value and a minimum value of the DCT coefficients of the residues of each SNR enhancement and a start point and an end point of a range of DCT coefficients to be quantized to "0" based on, the start point and the end point being extracted by performing R-D optimization,
wherein the DCT coefficients generate an average distortion value and an average bit rate, and
wherein the average distortion value and the average bit rate generated based on to the minimum value and a first reference value.

23. The dequantization method of claim 22, wherein the R-D optimization is to calculate the first reference value and a second reference value so that a cost function J=D+λ R is minimized, where D denotes the average distortion value, R denotes the average bit rate, and λ denotes a Lagrange multiplier.

24. A decoding method of providing improved SNR scalability comprising:
receiving an encoded bit stream;
extracting a DCT coefficient average value and a quantization coefficient value from the bit stream; and
performing dequantization based on the DCT coefficient average value and the quantization coefficient value,
wherein the DCT coefficient average value is set using a maximum value and a minimum value of the DCT coefficients of the residues of each SNR enhancement and a start point and an end point of a range of DCT coefficients to be quantized to "0", the start point and the end point being extracted by performing R-D optimization,
wherein the DCT coefficients generate an average distortion value and an average bit rate
wherein the R-D optimization is performed by calculating a first reference value and a second reference value,
wherein the minimum value is less than the calculated first reference value, and
wherein the maximum value is greater than the calculated second reference value, and
wherein the average distortion value and the average bit rate are based on to the minimum value and the first reference value.

25. The decoding method of claim 24, wherein the R-D optimization that calculated the first reference value and the second reference value is used so that a cost function J=D+λ R is minimized, where D denotes the average distortion value, R denotes the average bit rate, and λ denotes a Lagrange multiplier.

26. A recording medium having a computer readable storage non-transitory medium with computer readable program stored thereon for executing any one of claims 15 through 25.

* * * * *